United States Patent Office 3,434,930
Patented Mar. 25, 1969

3,434,930
METHOD OF PRODUCING TETRACYCLINE
Frantisek Paleckova, Zdenek Hostalek, and Zdenek Rehacek, Prague, Czechoslovakia, assignors to Spofa Sdruzeni Podniku pro Zdravotnickou Vyrobu, Prague, Czechoslovakia
No Drawing. Filed June 22, 1965, Ser. No. 466,093
Claims priority, application Czechoslovakia, June 26, 1964, 3,688/64
Int. Cl. C12d 9/22, 9/00; C12b 1/00
U.S. Cl. 195—80                    6 Claims

ABSTRACT OF THE DISCLOSURE

A method for producing tetracycline which comprises aerobically and under conditions of submerged growth at 25 to 35° C. and at a pH between 4.5 and 9.0 culturing Streptomyces NCIB 9692 in a liquid culturing medium containing assimilable carbon and nitrogen sources, whereby a substantial amount of tetracycline is accumulated; and recovering said tetracycline.

---

The present invention relates to a method of producing tetracycline, and more particularly, the present invention relates to a method of producing and accumulating tetracycline in a substantial amount by culturing under adequate fermentation conditions a strain which belongs to a new species of Streptomyces, and of recovering the thus produced tetracycline.

In the biosynthetic production of tetracycline certain difficulties are encountered when the culturing medium for the fermentative production of tetracycline contains chloride ions.

It has been suggested to overcome these difficulties by employing suitable chlorination inhibitors, or by reducing as much as possible the chlorine ion concentration in the culturing medium. Furthermore, certain materials may be used as part of the culturing medium which are known to enhance formation of the tetracycline molecule.

The majority of published works in this field appear to be devoted to attempts to inhibit the incorporation of chlorine into the tetracycline molecule during the course of the fermentation. Thus, it has been proposed to incorporate inorganic bromine compounds, iodides, thiocyanates and various precursors thereof into the culturing medium. It has also been proposed to include certain organic sulfur compounds in the culturing medium, as well as to reduce the chloride ion content or to eliminate chloride ions from the culturing medium for instance by ion-exchange or by precipitation.

It is an object of the present invention to provide a simple and effective method for directly producing a substantial amount of tetracycline by culturing a certain microorganism in a liquid medium.

It is a further object of the present invention, to provide a method of producing substantial amounts of tetracycline by fermentation of a chlorine-containing culturing medium with a certain microorganism.

It is yet another object of the present invention to utilize in the fermentative production of tetracycline a new Streptomyces strain which to applicants' best knowledge differs from all up to now described Streptomyces strains.

Other objects and advantages of the present invention will become apparent from a further reading of the description and of the appended claims.

With the above and other objects in view, the present invention contemplates a method for producing tetracycline which comprises aerobically and under conditions of submerged growth culturing Streptomyces NCIB 9692 in a liquid culturing medium containing assimilable carbon and nitrogen sources, whereby a substantial amount of tetracycline is accumulated, and recovering the tetracycline.

The inventors have found a new strain of Streptomyces which is suitable for the present fermentation process. This new strain has been registered at the National Collection of Industrial Bacteria, Torry Research Station, Aberdeen, Scotland under No. N.C.I.B. 9692 and at the Antibiotic Research Institute Roztoky near Prague under the No. sp. 1717. The new strain of Streptomyces will be referred to herein as NCIB 9692.

As will be described in detail further below, the new strain NCIB 9692 was compared with known strains of Streptomyces aureofaciens (NRRL 2209 and ATCC 12416c).

The parent microorganism for the fermentative production of tetracycline from which the new strain has been derived was an antagonistic actinomyces strain isolated from soil. This strain produced, in media conventionally used for production of chlorotetracycline, by fermentation predominantly chlorotetracycline (85% of the total activity) and only minor quantities of tetracycline (15%). The strain NCIB 9692 was derived from this parent strain by a mutagenic treatment, which comprised irradiation of the spore suspension for 10 seconds with ultraviolet light and subsequent cultivation of the irradiated spores on a sporulation medium containing 1,200 micrograms chlorotetracycline per milliliter of the medium. The thus obtained strain NCIB 9692 produced more than 95% of tetracycline even in culturing media containing relatively large proportions of chloride ions. In fact, a minimum concentration of chloride ions appears to be indispensable for the growth of NCIB 9692, and perferably the chloride ion concentration in the culturing medium should not be below 3 micromoles of chloride ions per milliliter. The remaining 5% were tetracycline-like substances which yielded after HCl hydrolysis the characteristic absorption maximum at 442 millimicrons.

The above described properties of NCIB 9692 with respect to the production of antibiotics, i.e., particularly tetracycline, are hereditary and remain unchanged upon transfer in the vegetative as well as in the spore stage, and also upon preservation.

The new strain NCIB 9692 is capable of producing tetracycline even at relatively high chloride ion concentrations in the culturing medium. For instance, in a medium containing 0.2% NaCl, more than 95% tetracycline (calculated as a percentage of the total production of tetracycline-like compounds) will be produced. Preferably, the chloride ion concentration in the culturing medium will be between about 3 and 300 micromoles of chlorineions per millimeter.

This property of the new strain, namely to produce predominantly tetracycline even in a chloride-ions-containing medium, allows a wide choice of the most advantageously available assimilable nitrogen sources, such as amino acids which may be present, for instance, in the form of protein hydrolyzates made from feathers, bones, vegetable proteins, etc., and which hydrolyzates may be produced by hydrolysis of the proteinaceous raw material with hydrochloric acid and subsequent neutralization. Hydrolyzates made by means of hydrochloric acid naturally contain considerable quantities of chlorides, however, nevertheless it is possible by using the new strain NCIB 9692 to produce an overwhelming proportion of tetracycline from culturing media containing such hydrolyzates as a source of nitrogen. It is also possible to use as the source of nitrogen in the culturing medium waste products from soup condiments or glutamic acid production formed by acid hydrolysis of suitable proteins (so-called humine substances).

These types of raw materials are generally not suitable as a source of nitrogen for the biosynthesis of tetracycline by means of strains which are normally capable of producing chlorotetracycline, since in view of the relatively high chlorine concentration in these raw materials and the culturing medium containing the same, at least it would be necessary to utilize one or the other chlorination inhibitor.

As far as known to the inventors, biosynthesis of tetracycline in media containing a high concentration of chlorine ions and without taking auxiliary steps such as the introduction of chlorination inhibitors, has never been described and it also does not seem to have been disclosed to use for the biosynthesis of tetracycline sodium chloride-containing components in the nutrient or culturing media, such as the above described acid or hydrochloric acid hydrolyzates of proteins.

Surprisingly, however, NCIB 9692 makes it perfectly possible to employ for the biosynthesis of tetracycline, apart from the more conventional components of the culturing medium, such as soy bean meal or molasses, also protein hydrolyzates with a high chloride ion content. These hydrolyzates, eventually, may fully replace the use of corn-steep liquor without requiring the introduction of any chlorination inhibitors.

A comparison of known strains used for tetracycline production with the new strain NCIB 9692 showed that the new strain differs from the known strains in a number of criteria.

In the following tables, the new strain NCIB 9692 is compared with the known strains *Streptomyces aureofaciens* NRRL 2209 and ATCC 12416c.

For the purpose of taxonomic characterization of these actinomycetes, the procedures were followed as suggested by the International Committee for Bacteriologic Nomenclature (Intern. Bull. Bact. Nomencl. Taxon. 13, 169, 1963; International Cooperative Project for Description and Deposition of Type Cultures of Streptomycetes; Method Manual, 1964, and also the procedures used by the Centraalbureau voor Schimmelcultures at Baarn, Netherlands.

Nutrient media for the cultivation of the strains were prepared from ingredients supplied by DIFCO * or original complete media were employed made by DIFCO for taxonomic differentiation of actinomycetes as a part of the International Cooperative Project for Description and Deposition of Type Cultures of Streptomycetes (ISP).

Table I describes the morphological characteristics of the full-grown sporulated aerial mycelia.

TABLE I.—MORPHOLOGICAL CHARACTERISTICS OF STREPTOMYCES NCIB 9692 AND S. auerofaciens NRRL 2209 AND ATTC 12416c

| Characteristic | NCIB 9692 | NRRL 2209 | ATCC 12416c |
| --- | --- | --- | --- |
| Sporophores or spore chains | Closed spirals and hooks, loops. | Hooks and loops | |
| Spore shape | Cylindrical | Boxy with the corners rounded up to ovoidal. | Boxy with the corners rounded up to ovoidal. |
| Spore size (μ): | | | |
| Average | 1.4 to 0.7 | 1.2 to 0.7 | 1.2 to 0.7. |
| Range | 1.1–1.8 to 0.6–0.8 | 0.9–1.4 to 0.5–0.9 | 0.9–1.6 to 0.6–0.9. |
| Spore surface at magnification of 8,000×. | Smooth | Smooth | Smooth. |
| At magnification of 49,000× | Parallel fibres | "Texture" surface* | "Texture" surface. |

*Fibres forming "texture" pattern.

According to the classification by Pridham, Hesseltine, Benedict (Appl. Microbiol. 6, 52–79, 1958), the strain NCIB 9692 belongs to the morphological group "Spira" (S), while the strains NRRL 2209 and ATCC 12416c belong to the group "Retinaculum-Apertum" (RA).

The well sporulated cultures of the strain NCIB 9692 form sporophores with short closed spirals and some hooks and loops. The sporophores of the strains NRRL 2209 and ATCC 12416c are characterized by hooks and loops but no spirals are observed.

Table II describes the colors of full grown sporulated aerial mycelia.

According to the Pridham-Hesseltine-Benedict classification, the strain NCIB 9692 belongs to the "griseus" series of the above mentioned group "Spira"; and the strains NRRL 2209 and ATCC 12416c belong to the "griseus" series of the group "Retinaculum-Apertum." The full grown aerial sporulated mycelium of the strain NCIB 9692, cultivated on various media, was white, grayish, gray, grayish-green, grayish-violet or greenish-violet. The same colors were observed also in NRRL 2209 and ATCC 12416c strains, however, not on identical media.

Significance differences in the colors of the sporulated aerial mycelia were observed especially on oatmeal agar (Medium ISP 3).

Significant differences in the colors of substrate mycelia of the strain NCIB 9692 as compared with the strains NRRL 2209 and ATCC 12416c were observed on oatmeal agar (Medium ISP 3) and on inorganic salts-starch agar (Medium ISP 4). On different media, the substrate mycelium of the strain NCIB 9692 was grayish, cream, brown-red or brownish-green. The strains NRRL 2209 and ATCC 12416c showed the following colors: grayish, cream, brown, greenish or brownish-green.

*DIFCO Laboratories, Inc., Detroit, Mich., USA.

TABLE II.—CULTURAL CHARACTERISTICS OF STREPTOMYCES NCIB 9692 AND S. AUREOFACIENS (NRRL 2209 AND ATCC 12416c)

| Culture | Medium | Amount of Growth | Sporulation | En Masse Spore Color | Soluble Pigment | Reverse Color |
|---|---|---|---|---|---|---|
| 9692 | Yeast extract-malt extract agar (ISP 2). | Good | Fair | Gray-violet, Oc 7t | None | Brown, Oc 5r. |
| 2209 | do | do | Moderate | do | do | Light Brown, Coo 5m. |
| 12416c | do | do | Fair | White and gray, Oc 7a, Oc 7m. | do | Yellow-brownish and brown, Coo 4b, Oc 4r. |
| 9692 | Oatmeal agar (ISP 3) | Fair | do | Gray-green-violet, Coo 7s. Sharp margins. | do | Gray-brown Coo 6s. |
| 2209 | do | Good | Good | Light gray and gray, Coo 7m, Coo 7t. Veil margins. | Light yellow-green, C 6c | Greenish, Co 6t. |
| 12416c | do | Fair | Fair | Light gray, Coo 7m. Veil margins. | do | Yellowish-green, C 6b. |
| 9692 | Inorganic salts-starch agar (ISP 4). | Good | Moderate | Gray-violetish, Oc 7t | None | Cream, Co 6b. |
| 2209 | do | do | Good | Gray-green-violet, Coo 7s | do | Gray, Co 7m. |
| 12416c | do | do | do | Gray-greenish, Co 7m | do | Brown-green, Co 6r. |
| 9692 | Glycerol asparagine agar (ISP 5). | Moderate | Scant | White, Coo 7a | do | Light gray, Coo 7b. |
| 2209 | do | Scant | None | | do | Do. |
| 12416c | do | do | do | | do | Do. |
| 9692 | Asparagine meat extract dextrose agar. | Fair | Fair | Gray-green-violet, Coo 7s | do | Yellow-brown, Coo 5s. |
| 2209 | do | Good | Good | Light gray, Oc 7b | do | Cream, Co 6b. |
| 12416c | do | Fair | Fair | Gray-greenish and white, Co 7m, Oc 7a. | do | Brown-greenish, Coo 5r. |
| 9692 | Potato dextrose agar | do | do | White and gray violet, Coo 7a, Oc 7t. | do | Brown-reddish, Oc 6s. |
| 2209 | do | do | do | Light gray, Oc 7c | Brown-greenish, Coo 6s | Light brown, Coo 5m. |
| 12416c | do | do | do | White and light gray, Coo 7a, Coo 7b. | Brown-greenish, Coo 5s | Dark brown, Oc 5r. |
| 9692 | Emerson's agar | do | None | | Light yellow-orange, Coo 3m. | Light brown-greenish with brown margin, Coo 4s, Oc 4r. |
| 2209 | do | do | do | | Yellowish, Co 5b | Cream, Coo 5b. |
| 12416c | do | do | do | | do | Brown, Oc 4r. |

Remarks: The color abbreviations are those of H. Prauser's Code determinating colors of aerial mycelia of Streptomycetes. (Z. Allg. Mikrobiologie 4/1:95–98, 1964). Matchings made in north daylight. Sporulation examination and final color matchings at 15 days. Plates incubated at 28° C.

Referring once more to Table I and the morphology of the spores, it is noted that the strain NCIB 9692 forms cylindrical spores having a smooth surface which shows at a magnification of approximately 50,000 times a pattern in the form of parallel fibrils. The strains NRRL 2209 and ATCC 12416c for a mixture of cylindrical to ovoidal or ovoidal spores with a smooth surface but with fibrils forming a "texture" pattern.

Table III summarizes the utilization of sugars by the three strains and particular significance should be ascribed to the distinct difference in the utilization of raffinose, which—as well as that of rhamnose—forms an essential part of the test for the actinomycetes classification (Kurosawa Kuroya Ishida J. Antib. Jap. 3, 879, 1950.)

TABLE III.—COMPARATIVE ABILITIES OF S. NVIB 9692 AND S. aureofaciens (NRRL 2209 AND ATCC 12416c) TO UTILIZE VARIOUS CARBON SOURCES FOR GROWTH IN THE BASAL MEDIUM OF PRIDHAM AND GOTTLIEB (J. BACT. 56: 107, 1948)

| Carbon Source | NCIB 9692 | NRRL 2209 | ATTC 12416c |
|---|---|---|---|
| No C-source (negative control) | − | − | − |
| d-Glucose | ++ | ++ | ++ |
| l-Arabinose | − | ++ | ++ |
| Sucrose | ++ | ++ | ++ |
| d-Xylose | − | + | ± |
| i-Inositol | − | − | − |
| d-Mannitol | − | − | − |
| d-Fructose | ++ | ++ | ++ |
| Rhamnose | − | − | − |
| Raffinose | ++ | − | − |
| Cellulose | − | − | ± |

++ Strongly positive utilization.
+ Positive utilization.
± Utilization doubtful.
− Utilization negative.

Table IV summarizes miscellaneous physiological reactions of Streptomyces NCIB 9692 and S. aureofaciens NRRL 2209 and ATCC 12416c.

It will be found that all of the tested strains grow on peptone-iron agar (Medium ISP 6) and on tyrosine agar (Medium ISP 7) without producing any melanoid pigment.

As indicated in Table II, the strain NCIB 9692 produced only on Emerson's agar a slight yellow-orange pigment. The two strains of S. aureofaciens formed a yellow, yellowish-green or brownish-green pigment on all media used.

TABLE IV.—MISCELLANEOUS PHYSIOLOGICAL REACTIONS OF STREPTOMYCES NCIB 9692 AND S. aureofaciens NRRL 2209 AND ATCC 12416c

| Medium and Incubation Time | Streptomyces NCIB 9692 | S. aureofaciens | |
|---|---|---|---|
| | | NRRL 2209 | ATCC 12416c |
| Bacto-Nitrate Broth (Med. ISP 8) at 14 days. | No nitrate reduction | No nitrate reduction | No nitrate reduction. |
| Peptone iron agar (Med. ISP 6) at 2 days. | No melanoid pigment production | No melanoid pigment production | No melanoid pigment production. |
| Tyrosine agar (Med. ISP 7) at 2 days. | do | do | Do. |
| Litmus milk (Difco) at 12 days | Good peptonization, no shift in pH | Coagulation, weak peptonization, slight shift in pH toward acid side. | Coagulation, weak peptonization, slight shift toward alkaline side. |
| Starch hydrolysis | Positive | Positive | Positive. |
| Gelatine at 14 days | Moderate growth, liquefaction | Moderate growth, no liquefaction | Moderate growth, no liquefaction. |

Referring again to Table IV, it will be seen that only the strain NCIB 9692 liquefied gelatin.

Following the ISP Method Manual 1964, no reduction of nitrates to nitrites was observed with respect to any of the tested strains.

The strain NCIB 9692 grows well on litmus milk which is peptonized distinctly without any significant change of pH. NRRL 2209 coagulated the milk with a faint peptonization and a slight shift in pH towards the acid side. ATCC 12416c differed from NRRL 2209 by a slight shift in pH toward the alkaline side.

All tested strains rapidly hydrolyze starch.

Table V summarizes the effect of mutual relationship on sporulation of the tested microorganism.

By using the cross-streak method, which is a common test for the antibiotic activity of actinomycetes, significant differences were observed in the degree of influence on the culture sporulation exerted by the metabolites of an older culture either of the parent strain or of another one of the tested strains. Whereas the strain NCIB 9692 stimulated the sporulation of strains NRRL 2209 and ATCC 12416c, the two last mentioned strains inhibited the sporulation of the strain NCIB 9692.

TABLE V.—EFFECT OF MUTUAL RELATIONSHIPS ON SPORULATION OF TESTED MICROORGANISM

| Culture | Test culture | | |
|---|---|---|---|
| | NCIB 9692 | NRRL 2209 | ATCC 12416c |
| NCIB 9692 | Stimulation | Stimulation | Stimulation |
| NRRL 2209 | Inhibition | do | Do. |
| ATCC 12416c | do | do | Do. |

Remarks: Cross-streak method; 5 plus 7 days at 28° C. on yeast extract-malt extract agar.

Table VI summarizes some of the significant comparisons described above.

TABLE VI

| | NCIB 9692 | NRRL 2209 | ATCC 1214c |
|---|---|---|---|
| Sporophores* | Short closed spirals; some hooks; loops. | Hooks, loops | Hooks, loops. |
| Spore surface | Parallel fibres | "Texture" | "Texture." |
| Color en masse spores* | Grey-green-violet | Light grey and grey | Light grey with brown margins. |
| Color of vegetative mycelium* | Grey-brown | Greenish | Light grey and green-violet. |
| Soluble pigment* | None | Light yellow-green | Light yellow-green. |
| C-utilization: | | | |
| Raffinose | ++ | − | ± |
| D-Xylose | − | + | ± |
| L-Arabinose | − | ++ | +. |
| Growth character | Sharp margins | Veil margins | Veil margins. |
| Litmus milk: | | | |
| Coagulation | ± | + | +. |
| Peptonization | +++ | + | ±. |
| Shift in pH to | No shift | Acid side | Alkaline side. |
| Gelation liquefaction | + | − | −. |
| Spore shape | Cylindrical | Boxy with the corners rounded up to ovoidal. | Boxy with the corners rounded up to ovoidal. |
| Spore size (μ): | | | |
| Average | 1.4 to 0.7 | 1.2 to 0.7 | 1.2 to 0.7. |
| Range | 1.1–1.8 to 0.6–0.8 | 0.9–1.4 to 0.5–0.9 | 0.9–0.6 to 0.6–0.9. |
| Sporulation | Inhibited by 2209, 12416c. | Stimulated by NICB 9692, 12416c. | Stimulated by NCIB 9692, 2209. |

* On oat-meal agar (Medium ISP 3).

Even in the presence of relatively high concentrations of chloride ions, the strain NCIB 9692 produces more than 95% tetracycline, based on the total production of tetracycline-like substances. In fact, the presence of at least some chlorine ions is indispensable. This ability of the strain NCIB 9692 to produce dominantly tetracycline in a chloride-ion containing medium is hereditary and remains unchanged during preparation of the strain in the vegetative or spore stage, and also upon preservation of stock cultures.

The following examples are given as illustrative only without, however, limiting the invention to the specific details of the examples.

Example I

A vegetative inoculum of strain NCIB 9692 is introduced into a medium of the following composition: sucrose 3%, molasses 0.2 %, soybean meal 2%, corn steep liquor 0.4%, ammonium sulfate 0.2%, calcium carbonate 0.4%. Cultivation is performed in 500 ml. flasks, filled with 80 ml. medium, on a reciprocal shaker at 28° C. (oxygen transfer rate 0.52 l. $O_2$/ml./hr.). Maximum production was reached after 96 hours of cultivation—1587 μg. of tetracycline per ml.; the content of other tetracycline-like substances yielding the characteristic absorption maximum at 442 mμ upon HCl hydrolysis did not exceed 5%.

Example II

A vegetative inoculum of strain NCIB 9692 was used to inoculate a medium of the following composition: sucrose 3%, molasses 0.2%, soybean meal 2%, corn-steep liquor 0.4%, ammonium sulfate 0.2%, sodium chloride 0.2%, calcium carbonate 0.4%. The same cultivation conditions were used as in Example I. The production maximum occurred after 96 hours—2005 μg./ml. of tetracycline, while the content of other tetracycline-like substances was less than 5% of the amount of tetracycline produced.

Example III

A vegetative inoculum of NCIB 9692 was introduced into a medium of the following composition: sucrose 3%, molasses 0.2%, soybean meal 2%, corn-steep liquor 0.4%, ammonium sulfate 0.2%, sodium chloride 0.2%, benzyl thiocyanate 2 μg./ml., calcium carbonate 0.4%. Cultivation conditions were the same as in Example I. The maximum of antibiotic production was observed after 96 hours—2920 μg./ml. of tetracycline, while the content of other compounds of tetracycline character did not exceed 5%, of the amount of tetracycline produced.

Example IV

A vegetative inoculum of NCIB 9692 was used to inoculate a medium of the following composition: sucrose 4%, molasses 0.2%, soybean meal 3%, corn-steep liquor 0.4%, ammonium sulfate 0.3%, benzyl thiocyanate 2 μg./ml., calcium carbonate 0.6%. The cultivation was run under the same condition as in Example I. In 120 hours the maximum of production was reached—4033 μg./ml. of tetracycline. Other tetracycline-like substances were present in an amount not exceeding 5% of the amount of tetracycline produced.

Example V

A vegetative inoculum of NCIB 9692 was used to inoculate a medium of the following composition: sucrose 3%, molasses 0.2%, soybean meal 2%, ammonium sulfate 0.2%, benzyl thiocyanate 2 μg./ml., calcium carbonate 0.4%. In the 96th hour of fermentation antibiotic production reached 2730 μg./ml., while the content of other tetracycline-like substances was less than 5% of the amount of tetracycline produced.

Example VI

A medium of the following composition was inoculated with a vegetative inoculum of NCIB 9692: sucrose 3%, molasses 0.2%, soybean meal 2%, humine 0.6%, ammonium sulfate 0.2%, benzyl thiocyanate 2 μg./ml., calcium carbonate 0.4%. Maximum of production was observed after 96 hours of cultivation, i.e., 3143 μg./ml. of tetracycline. Other tetracycline-like substances were present in an amount not exceeding 5% of the tetracycline produced.

Example VII

A medium of the following composition was inoculated with vegetative inoculum of NCIB 9692: sucrose 4%, molasses 0.2%, soybean meal 3%, ammonium sulfate 0.3%, benzyl thiocyanate 2 μg./ml., calcium carbonate 0.6%. After 120 hours of growth the production reached a maximum—3583 μg. of tetracycline/ml. Other tetracycline-like substances were present in an amount not exceeding 5% of the tetracycline produced.

Example VIII

A medium of the following composition was inoculated with a vegetative inoculum or NCIB 9692: sucrose 4%, molasses 0.2%, soybean meal 3%, humine 0.4%, ammonium sulfate 0.3%, benzyl thiocyanate 2 μg./ml., calcium carbonate 0.6%. Antibiotic production reached a maximum after 120 hours of cultivation—4143 μg. tetracycline/ml. Other tetracycline-like substances were present in an amount less than 5% of the tetracycline produced.

The recovery of tetracycline from the fermented medium can be performed by any known method, e.g., according to A. Virgilio, C. Hengeler, Farmaco (Pavia), Ed. Sci. 15, 164, 1960; Chem. Abstr. 54, 14567–b, 1960.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and described to be secured by Letters Patent is:

1. A method for producing tetracycline which comprises aerobically and under conditions of submerged growth culturing Streptomyces NCIB 9692 in a liquid culturing medium containing assimilable carbon and nitrogen sources, whereby a substantial amount of tetracycline is accumulated; and recovering said tetracycline.

2. A method for producing tetracycline which comprises aerobically and under conditions of submerged growth culturing Streptomyces NCIB 9692 in a liquid culturing medium containing assimilable carbon and nitrogen sources and between about 3 and 300 micromoles of chloride ions per milliliter, whereby a substantial amount of tetracyline is accumulated; and recovering said tetracycline.

3. A method for producing tetracycline which comprises aerobically and under conditions of submerged growth culturing Streptomyces NCIB 9692 in a liquid culturing medium containing assimilable carbon and an acid protein hydrolyzate as a nitrogen source, whereby a substantial amount of tetracycline is accumulated; and recovering said tetracycline.

4. A method for producing tetracycline which comprises aerobically and under conditions of submerged growth culturing Streptomyces NCIB 9692 in a liquid culturing medium containing assimilable carbon and a hydrochloric acid protein hydrolyzate as a nitrogen source, whereby a substantial amount of tetracycline is accumulated; and recovering said tetracycline.

5. A method for producing tetracycline which comprises aerobically and under conditions of submerged growth culturing Streptomyces NCIB 9692 in a liquid culturing medium containing assimilable carbon and an acid protein hydrolyzate as a nitrogen source and about 3 to about 300 micromoles of chloride ions per milliliter, whereby a substantial amount of tetracycline is accumulated; and recovering said tetracycline.

6. A method for producing tetracycline which comprises aerobically and under conditions of submerged growth culturing Streptomyces NCIB 9692 in a liquid culturing medium containing assimilable carbon and a hydrochloric acid protein hydrolyzate as a nitrogen source and between about 3 and 300 micromoles of chloride ions per milliliter, whereby a substantial amount of tetracycline is accumulated; and recovering said tetracycline.

References Cited

UNITED STATES PATENTS

| | | |
|---|---|---|
| 2,886,595 | 5/1959 | Heinemann et al. _____ 195—80 |
| 3,092,556 | 4/1963 | Growich et al. _____ 195—80 |

FOREIGN PATENTS

| | | |
|---|---|---|
| 920,126 | 3/1963 | Great Britain. |

OTHER REFERENCES

Villax, Joan: "Antimicrobial Agents and Chemotherapy," 1962, published by American Society for Microbiologists, Ann Arbor, Mich., pp. 661–668.

MAURICE W. GREENSTEIN, *Primary Examiner.*